(12) United States Patent
Syu et al.

(10) Patent No.: US 8,397,107 B1
(45) Date of Patent: Mar. 12, 2013

(54) DATA STORAGE DEVICE EMPLOYING DATA PATH PROTECTION USING BOTH LBA AND PBA

(75) Inventors: Mei-Man L. Syu, Fremont, CA (US); William B. Boyle, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 160 days.

(21) Appl. No.: 12/636,614

(22) Filed: Dec. 11, 2009

(51) Int. Cl.
*G06F 11/00* (2006.01)
(52) U.S. Cl. .......................... 714/52; 714/770; 711/154
(58) Field of Classification Search ................ 714/52, 714/770; 711/154
See application file for complete search history.

(56) References Cited

U.S. PATENT DOCUMENTS

| | | | | |
|---|---|---|---|---|
| 5,537,421 | A | * | 7/1996 | Dujari et al. ................ 714/785 |
| 5,613,066 | A | | 3/1997 | Matsushima et al. |
| 5,691,994 | A | * | 11/1997 | Acosta et al. ................ 714/784 |
| 5,812,564 | A | * | 9/1998 | Bonke et al. ................ 714/769 |
| 5,813,025 | A | | 9/1998 | Murphy et al. |
| 5,822,142 | A | | 10/1998 | Hicken |
| 5,828,513 | A | * | 10/1998 | Greenberg ................ 360/77.08 |
| 6,035,351 | A | | 3/2000 | Billings et al. |
| 6,044,483 | A | * | 3/2000 | Chen et al. ................ 714/762 |
| 6,092,231 | A | * | 7/2000 | Sze ................ 714/758 |
| 6,112,277 | A | | 8/2000 | Bui et al. |
| 6,125,469 | A | * | 9/2000 | Zook et al. ................ 714/769 |
| 6,175,686 | B1 | | 1/2001 | Noda |
| 6,191,712 | B1 | | 2/2001 | Still |
| 6,324,604 | B1 | | 11/2001 | Don et al. |
| 6,367,048 | B1 | * | 4/2002 | McAuliffe et al. ........... 714/758 |
| 6,385,711 | B1 | | 5/2002 | Colligan |
| 6,467,060 | B1 | * | 10/2002 | Malakapalli et al. ......... 714/758 |
| 6,532,517 | B1 | | 3/2003 | Wagner et al. |
| 6,574,774 | B1 | * | 6/2003 | Vasiliev ................ 714/800 |
| RE38,502 | E | | 4/2004 | Yonemitsu et al. |
| 6,751,686 | B2 | | 6/2004 | Takasugi et al. |
| 6,772,274 | B1 | | 8/2004 | Estakhri |
| 6,981,171 | B2 | * | 12/2005 | Hashemi ................ 714/5.11 |
| 6,988,178 | B1 | | 1/2006 | Shirai et al. |
| 7,076,603 | B1 | | 7/2006 | Chheda |
| 7,099,993 | B2 | | 8/2006 | Keeler |
| 7,178,086 | B2 | * | 2/2007 | Hassner et al. ................ 714/758 |
| 7,310,765 | B1 | * | 12/2007 | Feng et al. ................ 714/763 |
| 7,330,417 | B2 | | 2/2008 | Billau et al. |
| 7,461,202 | B2 | | 12/2008 | Forrer, Jr. et al. |
| 7,539,924 | B1 | * | 5/2009 | Vasquez et al. ................ 714/770 |
| 7,559,009 | B1 | * | 7/2009 | Ricci ................ 714/805 |
| 7,562,282 | B1 | * | 7/2009 | Rothberg ................ 714/785 |
| 7,574,558 | B2 | | 8/2009 | Morley et al. |
| 7,647,544 | B1 | * | 1/2010 | Masiewicz ................ 714/770 |
| 7,840,878 | B1 | * | 11/2010 | Tang et al. ................ 714/770 |
| 8,006,027 | B1 | | 8/2011 | Stevens et al. |
| 8,099,651 | B2 | * | 1/2012 | Normoyle et al. ............. 714/767 |
| 8,122,299 | B2 | * | 2/2012 | Si et al. ................ 714/49 |
| 8,176,385 | B2 | * | 5/2012 | Uzrad-Nali et al. .......... 714/758 |
| 8,190,963 | B1 | * | 5/2012 | Wu et al. ................ 714/755 |
| 8,327,236 | B2 | * | 12/2012 | Ukai ................ 714/781 |
| 2002/0138694 | A1 | | 9/2002 | Isshiki |
| 2003/0147167 | A1 | * | 8/2003 | Asano et al. ................ 360/53 |

(Continued)

*Primary Examiner* — Loan L. T. Truong (57) ABSTRACT

A data storage device is disclosed comprising a non-volatile memory including a plurality of memory segments. A write command is received comprising a logical block address (LBA) and user data. The LBA is mapped to a physical block address (PBA) for addressing one of the memory segments. First error code redundancy is generated in response to the LBA, and second error code redundancy in response to the PBA. User data and the first and second error code redundancy are written to the memory segment addressed by the PBA.

20 Claims, 6 Drawing Sheets

U.S. PATENT DOCUMENTS

| | | | |
|---|---|---|---|
| 2003/0163756 A1* | 8/2003 | George | 714/5 |
| 2003/0202270 A1* | 10/2003 | Ng et al. | 360/51 |
| 2004/0019718 A1 | 1/2004 | Schauer et al. | |
| 2004/0103360 A1* | 5/2004 | Mori et al. | 714/768 |
| 2004/0255093 A1 | 12/2004 | Forrer, Jr. et al. | |
| 2005/0036381 A1 | 2/2005 | Hassner et al. | |
| 2006/0120166 A1* | 6/2006 | Kim et al. | 365/185.33 |
| 2006/0256624 A1* | 11/2006 | Eggleston et al. | 365/189.01 |
| 2007/0174678 A1* | 7/2007 | King | 714/8 |
| 2007/0174682 A1* | 7/2007 | King | 714/8 |
| 2007/0186141 A1 | 8/2007 | Hashimoto et al. | |
| 2007/0204199 A1* | 8/2007 | Chung et al. | 714/763 |
| 2009/0037793 A1* | 2/2009 | Chuang et al. | 714/769 |
| 2009/0064163 A1* | 3/2009 | Boyd et al. | 718/104 |
| 2009/0150599 A1 | 6/2009 | Bennett | |
| 2009/0150637 A1* | 6/2009 | Hattori et al. | 711/170 |
| 2009/0172039 A1* | 7/2009 | Honami et al. | 707/200 |
| 2009/0172250 A1* | 7/2009 | Allen et al. | 711/103 |
| 2010/0011275 A1 | 1/2010 | Yang | |
| 2010/0088576 A1* | 4/2010 | Isono et al. | 714/770 |
| 2010/0131723 A1* | 5/2010 | Yorimitsu | 711/154 |
| 2011/0131472 A1* | 6/2011 | Antonakopoulos et al. | 714/773 |

\* cited by examiner

DATA STORAGE DEVICE EMPLOYING DATA PATH PROTECTION USING BOTH LBA AND PBA

BACKGROUND

Data storage devices, such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., flash memory). In order to enable defect mapping (mapping out of defective memory segments of the non-volatile memory), as well as enable wear leveling in solid state drives, the memory segments are typically accessed indirectly by mapping logical block addresses (LBAs) to physical block addresses (PBAs). That is, host access commands (write or read) comprise an LBA that is mapped to a PBA representing a memory segment, where the PBA may change over time due to relocating from a grown defect, or wear leveling to evenly distribute access to the memory segments.

When accessing a memory segment using LBA to PBA mapping, it is important for the storage device to access the correct memory segment. For various reasons, such as malfunctioning firmware, a data storage device may write/read data to/from the wrong PBA, or write the wrong data to the correct PBA, perhaps because of an error in accessing a cache buffer, or in the LBA to PBA mapping algorithm, or in the mapping of PBA to the memory segment. The prior art has employed various forms of "data path protection" wherein the LBA or the PBA may be used during the write/read operations to ensure the correct memory segment is read and that the memory segment stores the correct data during a read operation. For example, the prior art has suggested to seed an error code with either the LBA or the PBA during writing and reading which helps ensure the correct memory segment is being accessed, and that the correct data was written to the memory segment.

DETAILED DESCRIPTION OF EMBODIMENTS OF THE INVENTION

Figure 1A:
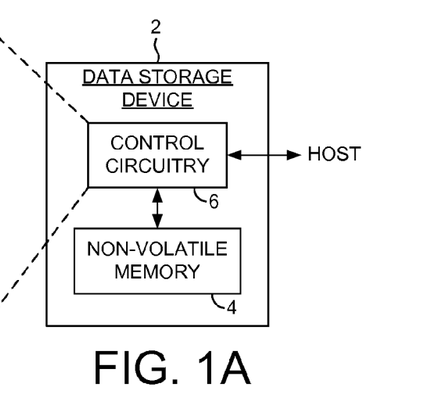
FIG. 1A shows a data storage device according to an embodiment of the present invention comprising a non-volatile memory including a plurality of memory segments.

FIG. 1A shows a data storage device 2 according to an embodiment of the present invention comprising a non-volatile memory 4 including a plurality of memory segments. The data storage device 2 further comprises control circuitry 6 for executing the flow diagram of FIG. 1B. A write command is received comprising a logical block address (LBA) and user data (step 8). The LBA is mapped to a physical block address (PBA) for addressing one of the memory segment (step 10). First error code redundancy is generated in response to the LBA (step 12), and second error code redundancy in response to the PBA (step 14). User data and the first and second error code redundancy are written to the memory segment addressed by the PBA (step 16).

Figure 1B:
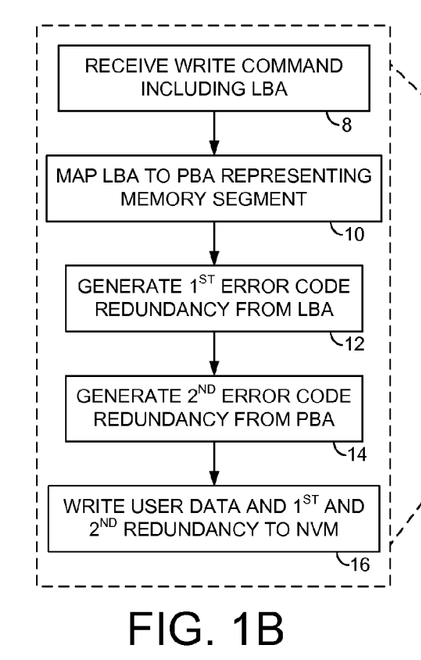
FIG. 1B shows a flow diagram according to an embodiment of the present invention for processing a write command by generating first error code redundancy in response to the LBA, and second error code redundancy in response to the PBA, wherein both the first and second error code redundancy are written to the non-volatile memory.
Figure 1C:
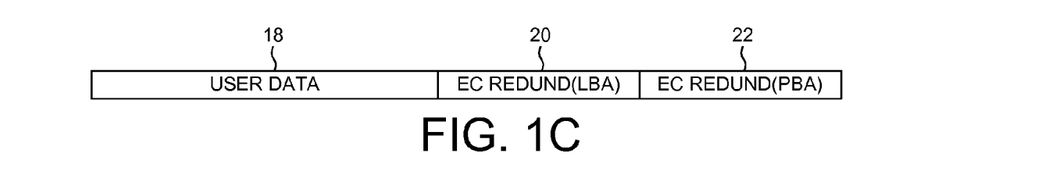
FIG. 1C illustrates a memory segment comprising user data and first and second error code redundancy according to an embodiment of the present invention.

FIG. 1C illustrates a memory segment after executing the write operation of FIG. 1B, wherein the written data comprises user data 18, first error correction redundancy 20 generated in response to the LBA, and second error correction redundancy 22 generated in response to the PBA. Any suitable error code may be employed to generate the first and second redundancy. In an embodiment shown in FIG. 1D, the first error code comprises an error detection code, such as a cyclic redundancy check (CRC) code, and the second error code comprises an error correction code (ECC) such as a Reed-Solomon code or a low-density parity-check (LDPC) code. In yet another embodiment illustrated in FIG. 1E, the LBA 24 is also written to the memory segment to facilitate data path protection and/or rebuilding of LBA to PBA mapping after a power failure.

Figure 2A:
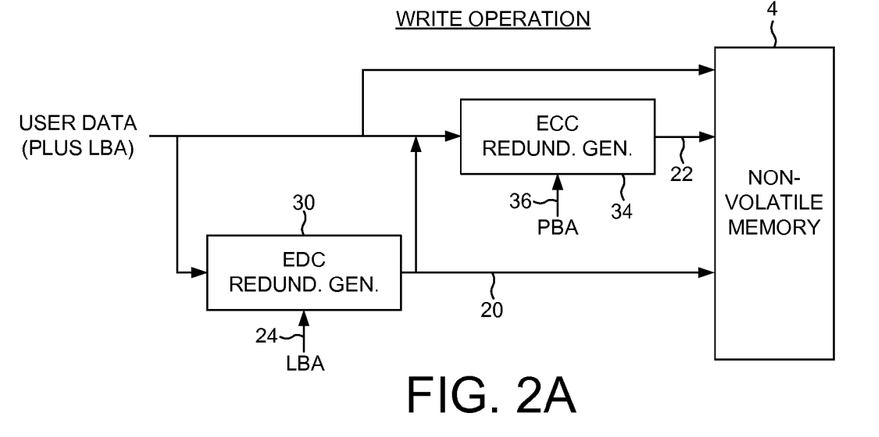
FIG. 2A shows control circuitry according to an embodiment of the present invention including an EDC redundancy generator for generating the first error code redundancy over the user data and the LBA, and an ECC redundancy generator for generating the second error code redundancy over the user data, LBA, and first error code redundancy.
Figure 3:
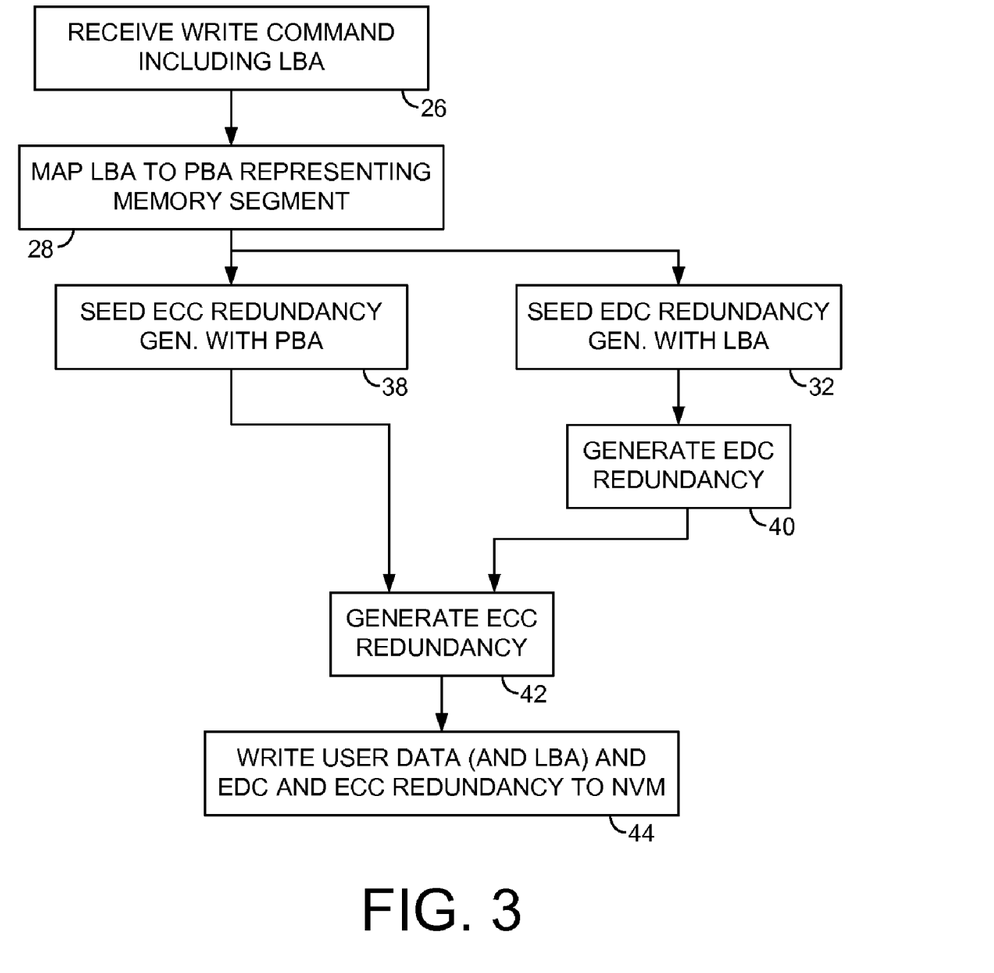
FIG. 3 is a flow diagram according to an embodiment of the present invention for implementing a write operation.

FIG. 2A illustrates a write operation according to an embodiment of the present invention which is understood with reference to the flow diagram of FIG. 3. A write command is received from a host comprising user data and a target LBA to write the user data (step 26). The LBA is mapped to a PBA representing a memory segment in the non-volatile memory (step 28). An EDC redundancy generator 30 is seeded with the target LBA 24 (step 32), and an ECC redundancy generator 34 is seeded with the PBA 36 mapped from the LBA 24 (step 38). The EDC generator 30 generates first error code redundancy 20 over the user data and target LBA 24 (step 40). The ECC redundancy generator 34 generates second error code redundancy 22 over the user data and target LBA 24 as well as over the first error code redundancy 20

(step 42). The user data 18 and target LBA 24, first error code redundancy 20, and second error code redundancy 22 are written to a memory segment in the non-volatile memory 4 in any suitable order (step 44).

Figure 2B:
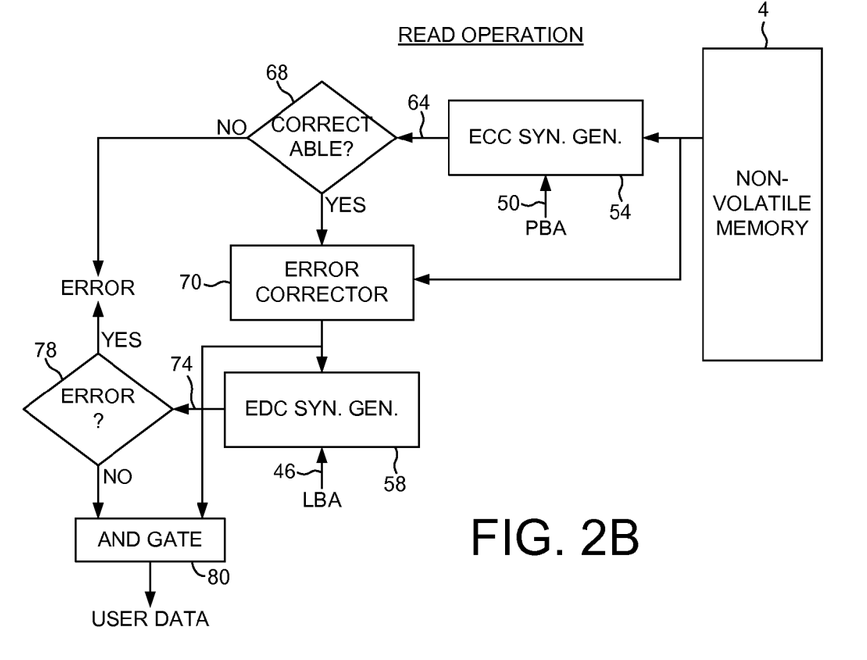
FIG. 2B shows control circuitry according to an embodiment of the present invention including an ECC syndrome generator and error corrector for detecting and correcting errors in the data read from the memory segment, and an EDC syndrome generator for detecting a miss-correction or a mismatch in the target LBA and LBA read from the memory segment.
Figure 4:
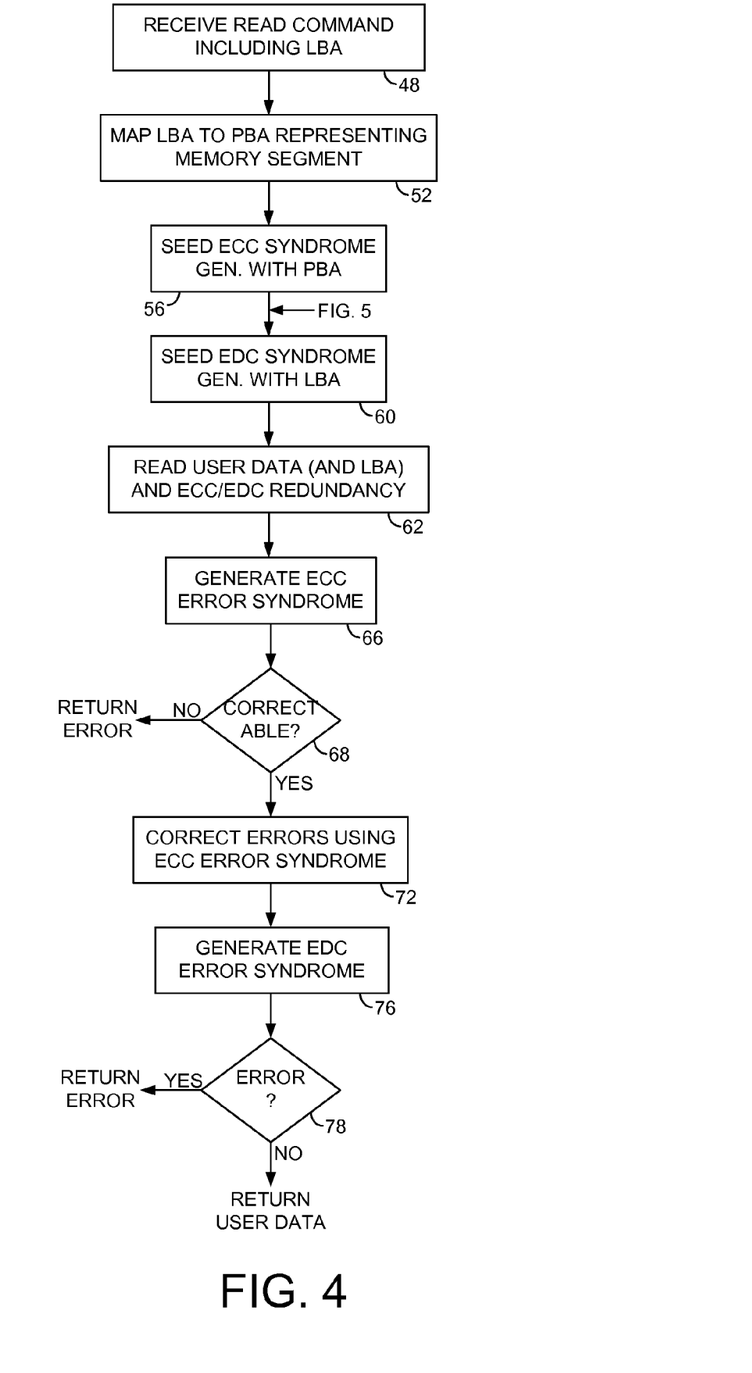
FIG. 4 is a flow diagram according to an embodiment of the present invention for implementing a read operation.

FIG. 2B illustrates a read operation according to an embodiment of the present invention which is understood with reference to the flow diagram of FIG. 4. A read command is received from a host comprising a target LBA 46 to read from (step 48). The LBA 46 is mapped to a PBA 50 representing a memory segment in the non-volatile memory (step 52). An ECC syndrome generator 54 is seeded with the PBA 50 (step 56), and an EDC syndrome generator 58 is seeded with the LBA 46 (step 60). The user data 18, LBA 24, first error code redundancy 20, and second error code redundancy 22 are read from the memory segment (step 62). The ECC syndrome generator 54 generates a first error syndrome 64 over all the data (step 66), wherein the first error syndrome 64 is processed to determine whether the memory segment is correctable (step 68). If the memory segment is correctable, an error corrector 70 processes the first error syndrome 64 to correct errors in the data read from the memory segment (step 72), which may include an error in the LBA 24. After correcting the errors, the EDC syndrome generator 58 generates a second error syndrome 74 over the user data 18, LBA 24, and first error code redundancy 20 (step 76). If the second error syndrome 74 indicates an error (step 78), it means a miss-correction occurred, or it means the target LBA 46 received with the read command does not match the LBA 24 read from the memory segment and an error is generated. Otherwise the user data 18 read from the memory segment is returned to the host (conceptually illustrated with an AND gate 80 in FIG. 2B).

Figure 1D:
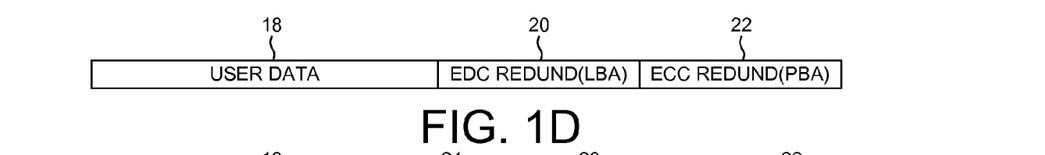
FIG. 1D illustrates an embodiment of the present invention wherein the first error code comprises an error detection code (EDC), and the second error code comprises an error correction code (ECC).
Figure 1E:
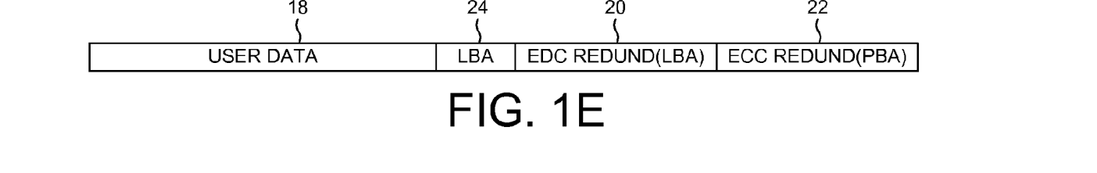
FIG. 1E illustrates an embodiment of the present invention wherein the LBA is written to the memory segment together with the first and second error code redundancy.

As illustrated in the embodiment of FIG. 1D, the above described write/read operations may be implemented without writing the target LBA 24 of the write command to the memory segment. This embodiment will still provide protection against a mismatch between the target LBA received in a read command and the corresponding LBA used during a write operation. In the embodiment of FIG. 1E where the target LBA 24 of a write command is written to the memory segment, the written LBA 24 may be used to rebuild the LBA to PBA mapping information, for example, after a power failure.

Figure 5:
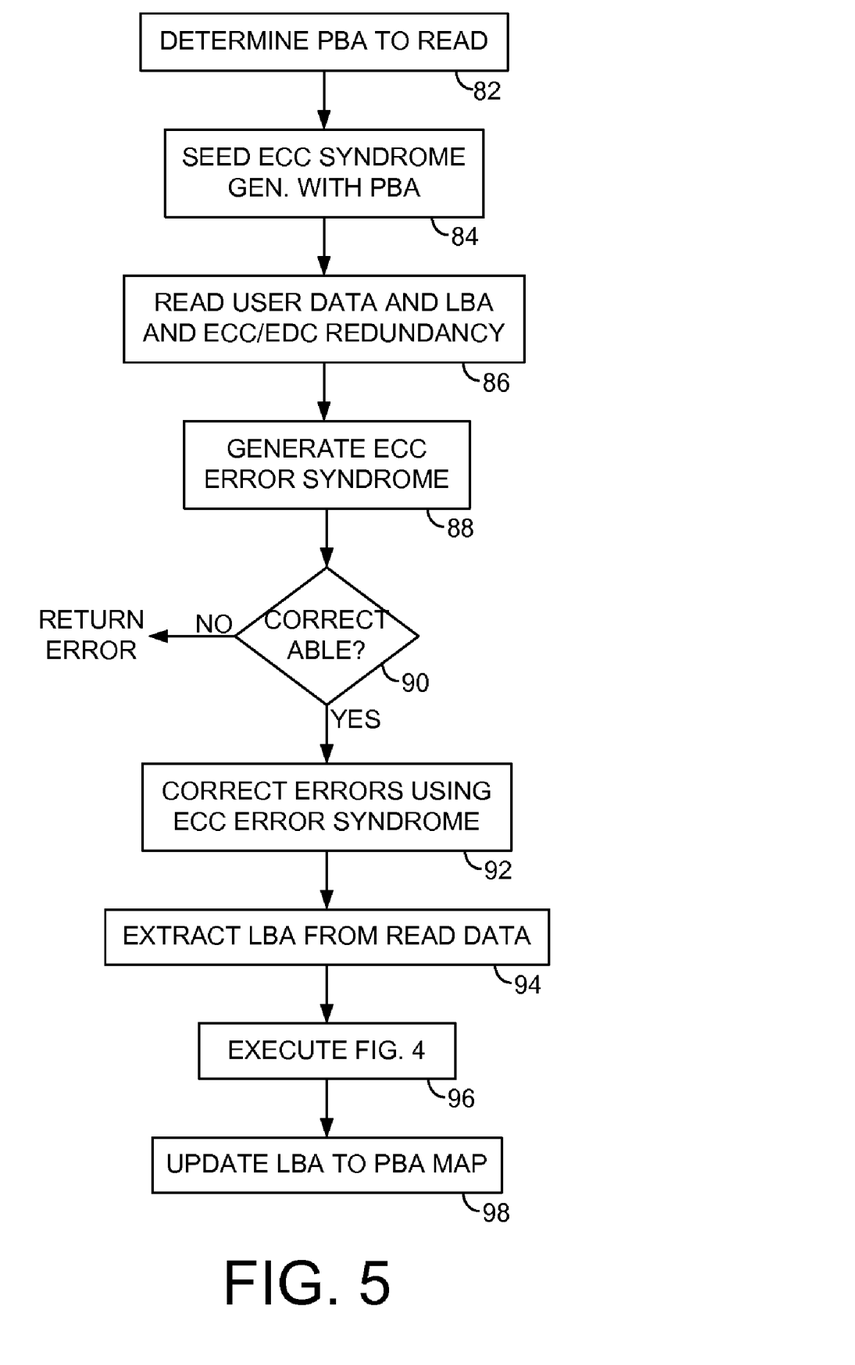
FIG. 5 is a flow diagram according to an embodiment of the present invention for recovering an LBA from a memory segment when the target LBA is unknown (e.g., when rebuilding the LBA to PBA mapping after a power failure).

When a power failure occurs, the more recently generated LBA to PBA mapping data stored in the volatile semiconductor memory of the data storage device may be lost. However, the most recently written PBAs may be known (e.g., when implementing a log-structured file system or derivative thereof). If the target LBA 24 of a write command is written to each memory segment as illustrated in the embodiment of FIG. 1E, the LBA 24 read from the memory segment can be used to regenerate the LBA to PBA mapping after a power failure. This embodiment is understood with reference to the flow diagram of FIG. 5 wherein a target PBA to read is determined based on the location of previous write operations (step 82). The ECC syndrome generator is seeded with the target PBA (step 84), and the user data, LBA, and first/second error code redundancy are read from the memory segment (step 86) to generate the ECC error syndromes (step 88). If the ECC error syndromes indicate the memory segment is correctable (step 90), the data read from the memory segment is corrected (step 92) which may include correcting an error in the LBA. The LBA is then extracted from the read data (step 94) and the flow diagram of FIG. 4 is re-executed (step 96) in order to verify that it is the correct LBA. If the flow diagram of FIG. 4 returns successfully, then the LBA to PBA mapping is updated (step 98).

In the embodiment of FIG. 2A, the first error code redundancy 20 and the second error code redundancy 22 are shown as being generated concurrently as the user data and LBA are written to the memory segment of the non-volatile memory 4. In an alternative embodiment not shown, the first error code redundancy 20 may be generated as the user data and LBA are received from the host in a write command, wherein the user data, LBA, and first error code syndrome 20 are staged in a buffer. When the staged write data is ready to be written to the memory segment, the second error code redundancy 22 is generated as the user data, LBA, and first error code redundancy 20 are read from the buffer.

Figure 6:
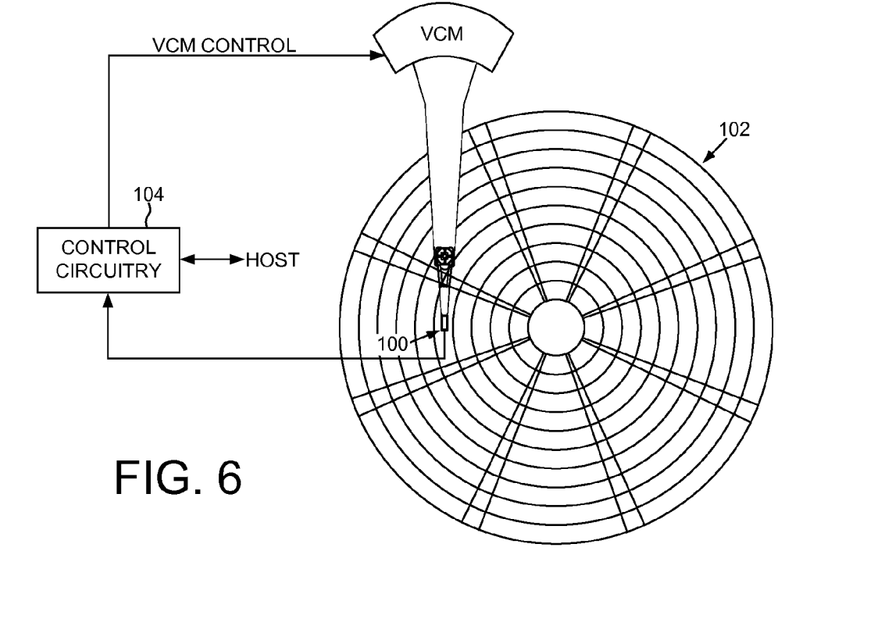
FIG. 6 shows an embodiment of the present invention wherein the data storage device comprises a disk drive.
Figure 7:
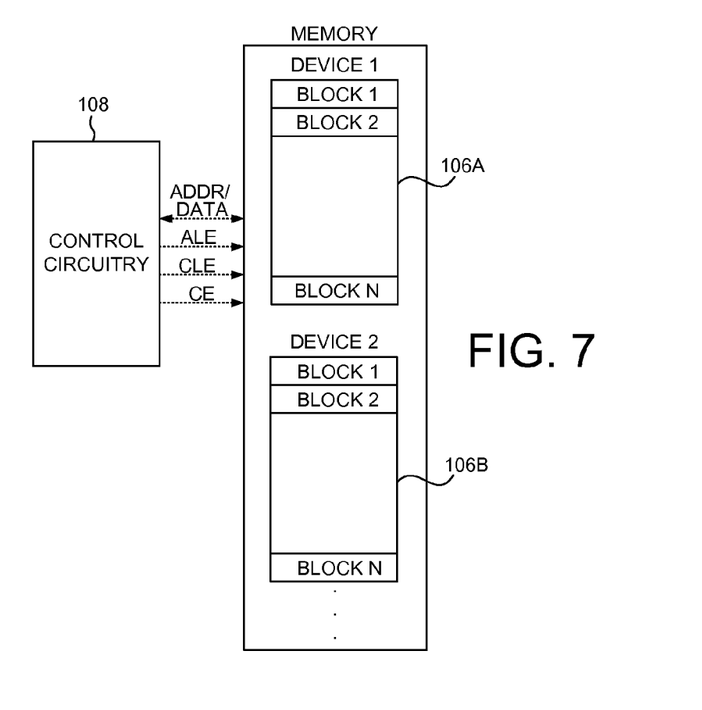
FIG. 7 shows an embodiment of the present invention wherein the data storage device comprises a solid state drive.

The embodiments of the present invention may be employed in any suitable data storage system. FIG. 6 shows a data storage system comprising a disk drive including a head 100 actuated over a disk 102 and control circuitry 104 for executing at least part of the flow diagrams described herein. FIG. 7 shows a solid state drive comprising a plurality of non-volatile semiconductor memories 106A, 106B, etc., such as flash memories, and control circuitry 108 for executing at least part of the flow diagrams described herein. A hybrid data storage system may also be employed comprising components of a disk drive shown in FIG. 6 combined with the non-volatile semiconductor memories shown in FIG. 7.

What is claimed is:

1. A data storage device comprising:
a non-volatile memory comprising a plurality of memory segments; and
control circuitry operable to:
receive a write command comprising a logical block address (LBA) and user data;
map the LBA to a physical block address (PBA) for addressing one of the memory segments;
generate first error code redundancy in response to the LBA;
generate second error code redundancy in response to the PBA;
write user data and the first and second error code redundancy to the memory segment addressed by the PBA;
write the LBA to the memory segment addressed by the PBA;
read the user data, the LBA, and the first and second error code redundancy from the memory segment addressed by the PBA;
generate a first error syndrome in response to the PBA and the LBA, the user data, and the first and second error code redundancy read from the memory segment;
correct at least one error in the LBA read from the memory segment to generate a corrected LBA;
generate a second error syndrome in response to the corrected LBA; and
detect an error in response to the second error syndrome.

2. The data storage device as recited in claim 1, wherein the control circuitry is further operable to generate the second error code redundancy in response to the first error code redundancy.

3. The data storage device as recited in claim 1, wherein the control circuitry is further operable to:
seed a first error code redundancy generator with the LBA to generate the first error code redundancy; and
seed a second error code redundancy generator with the PBA to generate the second error code redundancy.

4. The data storage device as recited in claim 1, wherein the control circuitry is further operable to:
generate the first error code redundancy using an error detection code; and generate the second error code redundancy using an error correction code.

5. The data storage device as recited in claim 4, wherein the control circuitry is further operable to:
- receive a read command from a host including the LBA;
- map the LBA to the PBA;
- read the user data and the first and second error code redundancy from the memory segment addressed by the PBA;
- generate a first error syndrome in response to the PBA and the user data and the first and second error code redundancy read from the memory segment;
- correct at least one error in the user data read from the memory segment to generate corrected user data;
- generate a second error syndrome in response to the LBA and the corrected user data; and
- detect an error in response to the second error syndrome.

6. The data storage device as recited in claim 5, wherein the control circuitry is further operable to:
- seed a first error code syndrome generator with the PBA to generate the first error syndrome; and
- seed a second error code syndrome generator with the LBA received from the host to generate the second error syndrome.

7. The data storage device as recited in claim 1, wherein the control circuitry is further operable to:
- seed a first error code syndrome generator with the PBA to generate the first error syndrome; and
- seed a second error code syndrome generator with the corrected LBA to generate the second error syndrome.

8. The data storage device as recited in claim 1, wherein the control circuitry is further operable to update an LBA to PBA map in response to the corrected LBA.

9. The data storage device as recited in claim 1, wherein the non-volatile memory comprises a disk.

10. The data storage device as recited in claim 1, wherein the non-volatile memory comprises a semiconductor memory.

11. A method of operating a data storage device comprising a non-volatile memory including a plurality of memory segments, the method comprising:
- receiving a write command comprising a logical block address (LBA) and user data;
- mapping the LBA to a physical block address (PBA) for addressing one of the memory segments;
- generating first error code redundancy in response to the LBA;
- generating second error code redundancy in response to the PBA; writing user data and the first and second error code redundancy to the memory segment addressed by the PBA;
- writing the LBA to the memory segment addressed by the PBA;
- reading the user data, the LBA, and the first and second error code redundancy from the memory segment addressed by the PBA;
- generating a first error syndrome in response to the PBA and the LBA, the user data, and the first and second error code redundancy read from the memory segment;
- correcting at least one error in the LBA read from the memory segment to generate a corrected LBA;
- generating a second error syndrome in response to the corrected LBA; and
- detect an error in response to the second error syndrome.

12. The method as recited in claim 11, further comprising generating the second error code redundancy in response to the first error code redundancy.

13. The method as recited in claim 11, further comprising:
- seeding a first error code redundancy generator with the LBA to generate the first error code redundancy; and
- seeding a second error code redundancy generator with the PBA to generate the second error code redundancy.

14. The method as recited in claim 11, further comprising:
- generating the first error code redundancy using an error detection code; and
- generating the second error code redundancy using an error correction code.

15. The method as recited in claim 14, further comprising:
- receiving a read command from a host including the LBA;
- mapping the LBA to the PBA;
- reading the user data and the first and second error code redundancy from the memory segment addressed by the PBA;
- generating a first error syndrome in response to the PBA and the user data and the first and second error code redundancy read from the memory segment;
- correcting at least one error in the user data read from the memory segment to generate corrected user data;
- generating a second error syndrome in response to the LBA and the corrected user data; and
- detecting an error in response to the second error syndrome.

16. The method as recited in claim 15, further comprising:
- seeding a first error code syndrome generator with the PBA to generate the first error code syndrome; and
- seeding a second error code syndrome generator with the LBA received from the host to generate the second error code syndrome.

17. The method as recited in claim 11, further comprising:
- seeding a first error code syndrome generator with the PBA to generate the first error syndrome; and
- seeding a second error code syndrome generator with the corrected LBA to generate the second error syndrome.

18. The method as recited in claim 11, further comprising updating an LBA to PBA map in response to the corrected LBA.

19. The method as recited in claim 11, wherein the non-volatile memory comprises a disk.

20. The method as recited in claim 11, wherein the non-volatile memory comprises a semiconductor memory.

* * * * *